US012650897B1

(12) United States Patent
Jia et al.

(10) Patent No.: US 12,650,897 B1
(45) Date of Patent: Jun. 9, 2026

(54) MEMORY DEVICE CONTROL METHOD AND APPARATUS, ELECTRONIC DEVICE, AND STORAGE MEDIUM

(71) Applicant: SUZHOU METABRAIN INTELLIGENT TECHNOLOGY CO., LTD., Suzhou (CN)

(72) Inventors: Shuaishuai Jia, Suzhou (CN); Daotong Li, Suzhou (CN); Hongrui Han, Suzhou (CN); Yandong Chen, Suzhou (CN); Shengxin Li, Suzhou (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 19/129,625

(22) PCT Filed: Jun. 5, 2024

(86) PCT No.: PCT/CN2024/097588
§ 371 (c)(1),
(2) Date: May 13, 2025

(87) PCT Pub. No.: WO2025/044378
PCT Pub. Date: Mar. 6, 2025

(30) Foreign Application Priority Data

Aug. 29, 2023 (CN) .......................... 202311098886.3

(51) Int. Cl.
G06F 11/10 (2006.01)
(52) U.S. Cl.
CPC ...... *G06F 11/1044* (2013.01); *G06F 11/1064* (2013.01)
(58) Field of Classification Search
None
See application file for complete search history.

(56) References Cited

U.S. PATENT DOCUMENTS 11,928,027 B1 * 3/2024 Trikamlal ........... G06F 11/1092
2015/0222398 A1 8/2015 Ott et al.
(Continued)

FOREIGN PATENT DOCUMENTS

CN 114064333 A 2/2022
CN 114968652 A 8/2022
(Continued)

OTHER PUBLICATIONS

I. Alam and P. Gupta, "COMET: On-die and In-controller Collaborative Memory ECC Technique for Safer and Stronger Correction of DRAM Errors," 2022 52nd Annual IEEE/IFIP International Conference on Dependable Systems and Networks (DSN), Baltimore, MD, USA, 2022, pp. 124-136, (Year: 2022).*

*Primary Examiner* — Daniel F. McMahon
(74) *Attorney, Agent, or Firm* — IPro, PLLC

(57) ABSTRACT

Embodiments of the present disclosure provides a memory device control method, apparatus, electronic device and storage medium, which relates to the field of memory device error correction technology. By acquiring side-band error correction code information in response to detecting error information of the memory device; acquiring on-die error correction code information; determining bit-width information of the memory device and error scenario information under the bit-width information; determining location information of the error information in a cache line of the memory device based on the side-band error correction code information and the on-die error correction code information; and performing an isolation operation on the memory device when the location information matches the error scenario information, the technical solution achieves effective isolation of storage memory even when encountering errors beyond the coverage of current memory error correc- (Continued)

tion mechanisms, thereby significantly reducing the probability of system crashes caused by memory device errors.

20 Claims, 5 Drawing Sheets

(56)                    References Cited

U.S. PATENT DOCUMENTS

2016/0358670 A1 *  12/2016  Son ......................... G06F 21/64
2017/0091025 A1      3/2017  Ahn et al.
2022/0238174 A1 *   7/2022  Schaefer ............ G11C 29/4401
2023/0195327 A1 *   6/2023  Park ....................... G11C 29/42
                                                                711/105

FOREIGN PATENT DOCUMENTS

CN          114996065  A      9/2022
CN          115016963  A      9/2022
CN          115391073  A     11/2022
CN          115391074  A     11/2022
CN          115629905  A      1/2023
CN          116841795  A     10/2023
WO          2023003902 A2      1/2023
WO          2023109571 A1      6/2023

* cited by examiner

FIG. 5
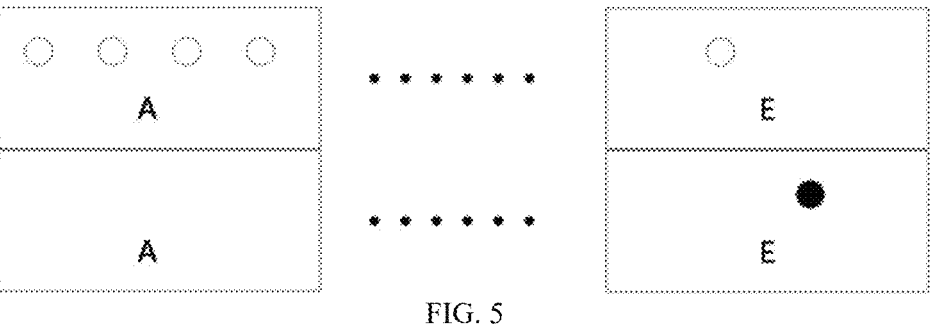
| 128 bit | 128 bit | 128 bit | 128 bit | 128 bit side-band ECC |
|---|---|---|---|---|
| 8 bits - ECC information | 8 bits - ECC information | 8 bits - ECC information | 8 bits - ECC information | 8 bits - ECC information |
FIG. 6
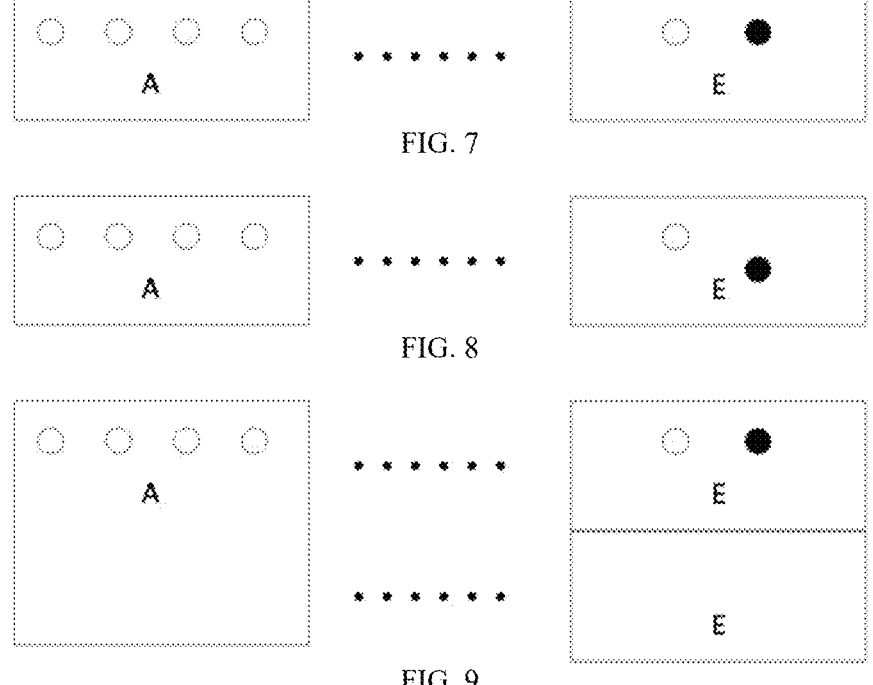
FIG. 7
FIG. 8
FIG. 9 side-band error correction information acquisition module ∫1201 on-die error correction information acquisition module ∫1202 bit-width information determining module ∫1203 location information determining module ∫1204 isolation operation execution module ∫1205

1

MEMORY DEVICE CONTROL METHOD AND APPARATUS, ELECTRONIC DEVICE, AND STORAGE MEDIUM

CROSS-REFERENCE TO RELATED APPLICATION

The present disclosure claims the priority of Chinese patent application filed in CNIPA on Aug. 29, 2023, with the application number of 202311098886.3 and the application name of "MEMORY DEVICE CONTROL METHOD AND APPARATUS, ELECTRONIC DEVICE, AND STORAGE MEDIUM", the entire contents of which are incorporated into the present disclosure by reference.

FIELD

The present disclosure relates to the technical field of memory device error correction, in particular to a memory device control method, a memory device control apparatus, a server, an electronic device and a computer non-transitory readable storage medium.

BACKGROUND

ECC, the full name of which is Error Correction Code, is a mechanism for checking and correcting errors. This is very important for data security and highly reliable applications.

Currently, ECC technology is commonly employed for error correction in memory devices. However, conventional ECC cannot cover all possible error distributions. As a result, when uncorrectable errors (UEs) occur in memory, there remains a risk of system crashes.

SUMMARY

The embodiments of the present disclosure provide a memory device control method, an apparatus, an electronic device and a computer non-transitory readable storage medium, to solve the problem of how to reduce the probability of system crashes caused by memory device failure.

The embodiments of the present disclosure provides a memory device control method, including:

acquiring side-band error correction code information in response to detecting error information of the memory device;

acquiring on-die error correction code information;

determining bit-width information of the memory device and error scenario information under the bit-width information;

determining location information of the error information in a cache line of the memory device based on the side-band error correction code information and the on-die error correction code information;

and performing an isolation operation on the memory device when the location information matches the error scenario information.

Optionally, the memory device includes a first particle and a second particle, the first particle and the second particle correspond to the same cache line, the bit-width information is four units; and the error scenario information is that there are a plurality of bit errors in burst information of the cache line when reading the cache line for the first particle at a first time and there are a plurality of bit errors in the burst information when reading the cache line for the second particle at a second time.

Optionally, the memory device includes a first particle and a second particle, the first particle and the second particle correspond to the same cache line, the bit-width information is four units; and the error scenario information is that there are a plurality of bit errors in the burst information of the cache line when reading the cache line for the first particle at a first time, and there are single bit errors in the burst information when reading the cache line for the second particle at the second time, and there are a plurality of target bit errors in 128-bit data contained in a consecutive prefetch file of the second particle, and the target bit errors are in the same cache line.

Optionally, the memory device includes a first particle and a second particle, the first particle and the second particle correspond to the same cache line, the bit-width information is four units; and the error scenario information is that there are a plurality of bit errors in the burst information of the cache line when reading the cache line for the first particle at a first time, and there are single bit errors in the burst information when reading the cache line for the second particle at the second time, and there are a plurality of target bit errors in 128-bit data contained in a consecutive prefetch file of the second particle, and the target bit errors are in different cache lines.

Optionally, the memory device includes a first particle and a second particle, the first particle and the second particle correspond to the same cache line, the bit-width information is eight units or sixteen units; and the error scenario information is that there are a plurality of bit errors in the burst information of the cache line when reading the cache line for the first particle at a first time, and there are a plurality of bit errors in the burst information when reading the cache line for the second particle at a second time.

Optionally, the memory device includes a first particle and a second particle, the first particle and the second particle correspond to the same cache line, the bit-width information is eight units; and the error scenario information is that there are a plurality of bit errors in the burst information of the cache line when reading the cache line for the first particle at a first time, and there are single bit errors in the burst information when reading the cache line for the second particle at the second time, and there are a plurality of target bit errors in 128-bit data contained in a consecutive prefetch file of the second particle, and the target bit errors are in the same cache line.

Optionally, the memory device includes a first particle and a second particle, the first particle and the second particle correspond to the same cache line, the bit-width information is sixteen units; and the error scenario information is that there are a plurality of bit errors in the burst information of the cache line when reading the cache line for the first particle at a first time, and there are single bit errors in the burst information when reading the cache line for the second particle at a second time, and there are a plurality of target bit errors in 128-bit data contained in a consecutive prefetch file of the second particle.

Optionally, the memory device is mounted on a server, the server is configured with a basic input and output system, and the memory device is provided with a corresponding memory controller, and the method further includes:

in response to monitoring the error information of the memory device, performing an inspection operation on the memory device using the memory controller, and triggering the basic input and output system to execute a system management interrupt operation.

Optionally, a step of acquiring side-band error correction code information includes:

acquiring side-band error correction code information by using the basic input and output system.

Optionally, the step of acquiring on-die error correction code information includes:

acquiring on-die error correction code information by using the basic input and output system.

Optionally, the method is applied to error checking and correcting procedures, and further includes:

when the location information does not match the error scenario information, exiting the error checking and correcting procedure by the basic input and output system.

Optionally, the server is configured with an operating system, and the step of performing isolation operation on the memory device includes:

using the basic input and output system to generate power management standard event information for the memory device;

sending the power management standard event information to the operating system by using the basic input and output system to control the operating system to perform system control interrupt on the memory device.

Optionally, the method further including:

when the location information matches the error scenario information, performing a repair operation on the memory device.

Optionally, the step of performing the repair operation on the memory device includes:

performing the repair operation on the memory device by using an adaptive dual-device data correction mechanism.

Optionally, the step of performing the repair operation on the memory device includes:

performing the repair operation on the memory device by using a post-packaging repair mechanism.

Optionally, the step of performing the repair operation on the memory device includes:

performing the repair operation on the memory device by using a partial cache line sparing mechanism.

Optionally, the method further including:

generating offline page information for the memory device by invoking a platform error interface using the operating system.

Optionally, the error scenario information is a number of bit errors in the burst information of different target particles in the same cache line at different times.

The embodiments of the present disclosure further discloses a memory device control apparatus, including:

a side-band error correction code information acquisition module, configured to in response to detecting error information of the memory device, acquire side-band error correction code information;

a on-die error correction code information acquisition module, configured to acquire on-die error correction code information;

a bit-width information determining module, configured to determine bit-width information of the memory device and error scenario information under the bit-width information;

a location information determining module, configured to determine location information of the error information in a cache line of the memory device based on the side-band error correction code information and the on-die error correction code information;

and an isolation operation execution module, configured to perform an isolation operation on the memory device when the location information matches the error scenario information.

Optionally, the memory device includes a first particle and a second particle, the first particle and the second particle correspond to the same cache line, the bit-width information is four units; and the error scenario information is that there are a plurality of bit errors in burst information of the cache line when reading the cache line for the first particle at a first time and there are a plurality of bit errors in the burst information when reading the cache line for the second particle at a second time.

Optionally, the memory device includes a first particle and a second particle, the first particle and the second particle correspond to the same cache line, the bit-width information is four units; and the error scenario information is that there are a plurality of bit errors in the burst information of the cache line when reading the cache line for the first particle at a first time, and there are single bit errors in the burst information when reading the cache line for the second particle at the second time, and there are a plurality of target bit errors in 128-bit data contained in a consecutive prefetch file of the second particle, and the target bit errors are in the same cache line.

Optionally, the memory device includes a first particle and a second particle, the first particle and the second particle correspond to the same cache line, the bit-width information is four units; and the error scenario information is that there are a plurality of bit errors in the burst information of the cache line when reading the cache line for the first particle at a first time, and there are single bit errors in the burst information when reading the cache line for the second particle at the second time, and there are a plurality of target bit errors in 128-bit data contained in a consecutive prefetch file of the second particle, and the target bit errors are in different cache lines.

Optionally, the memory device includes a first particle and a second particle, the first particle and the second particle correspond to the same cache line, the bit-width information is eight units or sixteen units; and the error scenario information is that there are a plurality of bit errors in the burst information of the cache line when reading the cache line for the first particle at a first time, and there are a plurality of bit errors in the burst information when reading the cache line for the second particle at a second time.

Optionally, the memory device includes a first particle and a second particle, the first particle and the second particle correspond to the same cache line, the bit-width information is eight units; and the error scenario information is that there are a plurality of bit errors in the burst information of the cache line when reading the cache line for the first particle at a first time, and there are single bit errors in the burst information when reading the cache line for the second particle at the second time, and there are a plurality of target bit errors in 128-bit data contained in a consecutive prefetch file of the second particle, and the target bit errors are in the same cache line.

Optionally, the memory device includes a first particle and a second particle, the first particle and the second particle correspond to the same cache line, the bit-width information is sixteen units; and the error scenario information is that there are a plurality of bit errors in the burst information of the cache line when reading the cache line for the first particle at a first time, and there are single bit errors in the burst information when reading the cache line for the second particle at a second time, and there are a plurality of target bit errors in 128-bit data contained in a consecutive prefetch file of the second particle.

Optionally, the error scenario information is a number of bit errors in the burst information of different target particles in the same cache line at different times.

Optionally, the memory device is mounted on a server, the server is configured with a basic input and output system, and the memory device is provided with a corresponding memory controller, and the apparatus further includes:

in response to monitoring the error information of the memory device, performing an inspection operation on the memory device using the memory controller, and triggering the basic input and output system to execute a system management interrupt operation.

Optionally, the side-band error correction code information acquisition module includes:

acquiring side-band error correction code information by using the basic input and output system.

Optionally, the on-die error correction code information acquisition module includes:

acquiring on-die error correction code information by using the basic input and output system.

Optionally, the method is applied to error checking and correcting procedures, and the apparatus further includes:

an error checking and correcting procedure existing module, configured to when the location information does not match the error scenario information, exit the error checking and correcting procedure by the basic input and output system.

Optionally, the server is configured with an operating system, and the isolation operation execution module includes:

a power management standard event information generation module, configured to use the basic input and output system to generate power management standard event information for the memory device;

a memory device executing system control interrupt module, configured to send the power management standard event information to the operating system by using the basic input and output system to control the operating system to perform system control interrupt on the memory device.

Optionally, the apparatus further including:

a repair module, configured to when the location information matches the error scenario information, perform a repair operation on the memory device.

Optionally, the repair module includes:

a first repair module, configured to perform the repair operation on the memory device by using an adaptive dual-device data correction mechanism.

Optionally, the repair module includes:

a second repair module, configured to perform the repair operation on the memory device by using a post-packaging repair mechanism.

Optionally, the repair module includes:

a third repair module, configured to perform the repair operation on the memory device by using a partial cache line sparing mechanism.

Optionally, the apparatus further including:

an offline page information generation module, configured to generate offline page information for the memory device by invoking a platform error interface using the operating system.

The embodiments of the present disclosure further discloses a server, wherein the server is provided with a memory device, and is configured to acquire side-band error correction code information in response to detecting error information of the memory device; acquire on-die error correction code information; determine bit-width information of the memory device and error scenario information under the bit-width information; determine location information of the error information in a cache line of the memory device based on the side-band error correction code information and the on-die error correction code information; and perform an isolation operation on the memory device when the location information matches the error scenario information.

The embodiments of the present disclosure further discloses an electronic device including a processor, a communication interface, a memory and a communication bus, wherein the processor, the communication interface and the memory communicate with each other through the communication bus;

the memory is configured to store computer programs;

the processor is configured to implement the method according to the embodiments of the present disclosure when executing the program stored in the memory.

The embodiments of the present disclosure further discloses a computer non-transitory readable storage medium having stored thereon instructions which, when executed by one or more processors, cause the processors to perform the method according to the embodiments of the present disclosure.

The embodiments of the present disclosure include the following advantage.

In the embodiments of the present disclosure, by acquiring side-band error correction code information in response to detecting error information of the memory device; acquiring on-die error correction code information; determining bit-width information of the memory device and error scenario information under the bit-width information; determining location information of the error information in a cache line of the memory device based on the side-band error correction code information and the on-die error correction code information; and performing an isolation operation on the memory device when the location information matches the error scenario information, the technical solution achieves effective isolation of storage memory even when encountering errors beyond the coverage of current memory error correction mechanisms, thereby significantly reducing the probability of system crashes caused by memory device errors.

BRIEF DESCRIPTION OF THE DRAWINGS

FIG. 5 is a schematic diagram C for memory particles provided in the embodiment of the present disclosure;

FIG. 6 is a schematic diagram of a cache line data provided by an embodiment of the present disclosure;

FIG. 7 is a schematic diagram D for memory particles provided in the embodiment of the present disclosure;

FIG. 8 is a schematic diagram E for memory particles provided in the embodiment of the present disclosure;

FIG. 9 is a schematic diagram F for memory particles provided in the embodiment of the present disclosure;

DETAILED DESCRIPTION

Figures 1, 2, 3, 4:
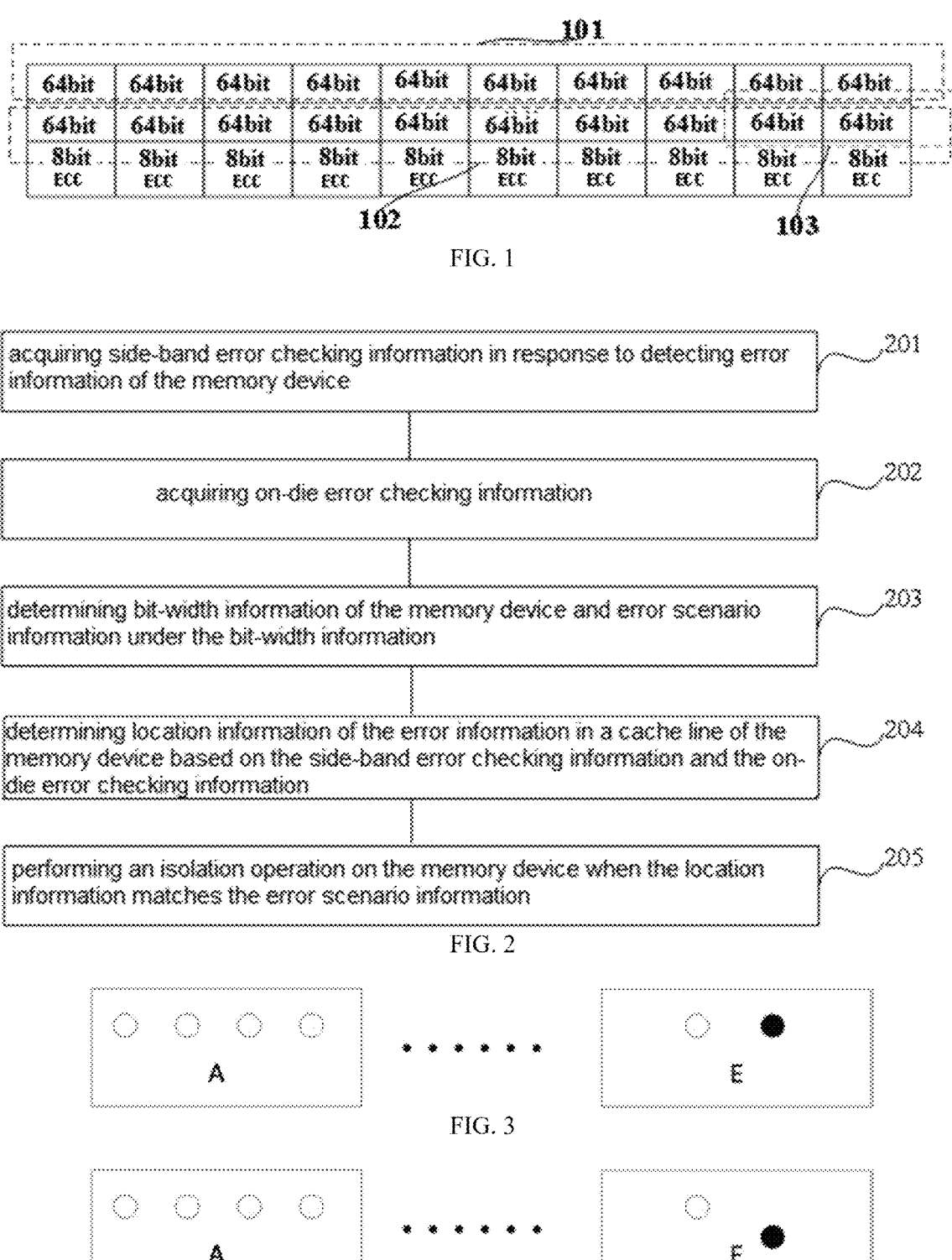
FIG. 1 is a schematic diagram of cache line data in practical application.
FIG. 2 is a flowchart of steps of a memory device control method provided in an embodiment of the present disclosure.
FIG. 3 is a schematic diagram A for memory particles provided in an embodiment of the present disclosure.
FIG. 4 is a schematic diagram B for memory particles provided in the embodiment of the present disclosure.

In order to make the above objects, features and advantages of the present disclosure more obvious and easy to understand, the present disclosure will be further described in detail with the attached drawings and specific embodiments.

In order to make persons skilled in the art better understand the embodiments of the present disclosure, some technical terms involved in the embodiments of the present disclosure are explained below.

ECC: Error Checking and Correction;

BIOS: Basic Input Output System, whose Chinese name is "Basic Input Output System" after literal translation, is an industry standard firmware interface on IBM PC compatible system. BIOS is the first software loaded when the computer starts. In fact, it is a set of programs solidified on a ROM chip on the motherboard of the computer, which stores the most important basic input and output programs of the computer, self-checking programs after starting up and self-starting programs of the system, and it can read and write the specific information of system settings from CMOS. Its main function is to provide the lowest and most direct hardware setting and control for computers. In addition, the BIOS also provides some system parameters to the operating system. The change of system hardware is hidden by BIOS, and the program uses BIOS function instead of directly controlling the hardware. Modern operating systems ignore the abstraction layer provided by BIOS and directly control hardware components.

UCE: Uncorrectable Error;

CE: Correctable Error;

CPER: Common Platform Error Record;

ACPI: Advanced Configuration and Power Management Interface, which can be used as a power management standard in practical application;

APEI: ACPI Platform Error Interface, a platform error interface for ACPI;

IMC: Integrated Memory Controller;

Memory Controller generally refers to a memory controller. Memory controller is an important part of computer system to control memory and be responsible for data exchange between memory and CPU. The memory controller determines the maximum memory capacity, the number of memory BANK, the type and speed of memory, the depth and width of particle data, and other important parameters, that is to say, it determines the memory performance of the computer system, which also has a great impact on the overall performance of the computer system.

ADDDC: Adaptive Double Device Data Correction (Multiple Region);

PPR: post-packaging Repair;

PCLS: Partial Cache Line Sparing;

DDR: Double Data Rate, DDR SDRAM=double rate synchronous dynamic random access memory, which is commonly called DDR, wherein, SDRAM is the abbreviation of Synchronous Dynamic Random Access Memory, namely a synchronous dynamic random access memory.

The full name of DIMM is Dual-Inline-Memory-Modules, and its Chinese name is dual-inline memory module, which refers to a new type of memory bank after the introduction of Pentium CPU, and it provides a 64-bit data channel.

Cache line;

Bit: a unit of information.

In practical application, ECC mechanisms commonly used in related technologies include:

Side-band ECC, Side-band Error Checking and Correcting verification mechanism;

Side-band ECC is the ECC of standard DDR memory, and the generation and verification of ECC can be completed by the Memory Controller. For DDR5, the data channel is 32-bit wide, and there is an extra special 8-bit ECC channel. At the same time, DDR 5 supports dual channels (80-bit in total), and the DIMM side also has a special particle storage ECC.

Read and write operations are as follows.

Write: Memory Controller will calculate ECC according to 32-bit Data, and then write ECC position at DIMM end through ECC channel.

Reading: Memory Controller will read Data and ECC, and then Memory Controller will calculate ECC according to Data, and then verify it by comparing the read ECC with the calculated ECC.

Error correction techniques such as ADDDC add extra ECC particles to memory, and the process is realized by IMC. Error correction only allows the data (DDR 5:40 bit) error of each burst information (Burst) to appear on one particle. When each burst error appears on more than two particles, accurate error correction cannot be guaranteed.

On-die ECC, a error checking and correcting mechanism on dies;

On-die ECC is a new function introduced on DDR5. With the double improvement of DDR speed and technology, the probability of memory problems has greatly increased. In order to reduce the memory problems, DDR particles can verify their own data (data 128-bit, ECC 8-bit). That is, the particles of DDR5 have the functions of ECC generation, verification and storage, that is, all actions are carried out in DIMM particles. Therefore, ECC data does not need to be transmitted to the Memory Controller end. This function is transparent to the Memory Controller and can be used with Side-band ECC without interference. Under the premise of not increasing IMC load, the RAS characteristics of the memory are enhanced, and the specific reading and writing operations are as follows.

Write: Memory Controller transfers Data to DIMM, and DIMM particles calculate ECC and store it to the particles.

Reading: DIMM particles read Data and corresponding ECC, DIMM particles calculate ECC again, and verify it with the read ECC.

As can be seen from the above, On-Die ECC is a supplement to the existing ECC technology in memory to the defect of single-bit or multi-bit error in a single burst information on a single particle, which can independently correct the data of 16 burst information (128 bits) accessed by each particle, that is, single bit error can also be corrected when a plurality of particles appear at the same time, and the two technologies thus work synergistically.

In addition, as can be seen from the above, On-Die ECC adds 8 bits of ECC correction bits for every 128 bits of data.

For DDR5 x4 particles with a prefetch of 16, the prefetched data length per operation is 64 bits. However, On-Die ECC still processes data in 128-bit segments per prefetch. Therefore, each read or write operation requires an additional 64-bit read from the internal array to compute ECC. During data writes, since the input data length is only 64 bits, the system must also read an extra 64 bits from the internal array to combine with the write data, forming a 128-bit block for ECC calculation. This means that for x4 particles, each 8-bit ECC correction value corresponds to two 64-bit sections.

For DDR5 x8 particles with a prefetch of 16, the prefetched data length per operation is 128 bits, which just meets the requirements of On-Die ECC correction.

For DDR5 x16 particles with a prefetch of 16, the prefetched data length per operation is 256 bits, corresponding to two sets of independent 128-bit data and 8-bit correction bits, and the verification and error correction process is performed in parallel;

Burst refers to a burst length, where "burst" denotes a method of consecutive data transfer between adjacent memory cells (columns) within the same row. The number of memory cells (columns) involved in this consecutive transfer constitutes the burst length. In DDR SDRAM, it specifically indicates a number of consecutive transfer cycles, which generally corresponds to the number of prefetch bits.

Referring to FIG. 1, FIG. 1 is a schematic diagram of cache line data in practical application, which shows two cache lines in X4-bit-wide memory, where an area 101 is a cache line, an area 102 is another cache line and the rest is ECC data of on-ecc, which is not included in data statistics. Wherein, the two particles of an area 103 are particles of Side-band ECC.

For example, if the ECC error correction method of the related art is adopted, when the Side-band ECC appears, the data (DDR 5:40 bit) error of each Burst appears on one particle, and when each burst error appears on more than two particles, the accurate error correction cannot be guaranteed. On-die Ecc only allows one error per particle every 128 bits, and more than two errors cannot be covered, which leads to the risk of system crash.

In view of the above problems, the embodiments of the present disclosure provides a memory device control method. For memory devices with a specific bit width, this method identifies high-risk scenarios beyond the coverage of existing ECC. Upon detecting error information related to the memory device, it correlates the Side-band ECC information and on-die ECC information with the high-risk scenarios, and determines the error as a high-risk error when successfully correlating, to control the memory, thereby reducing the risk of system crash caused by the memory error.

Referring to FIG. 2, a flowchart of steps of a memory device control method provided in an embodiment of the present disclosure is shown, which may specifically include the following steps.

Step 201, acquiring side-band error correction code information in response to detecting error information of the memory device;

Step 202, acquiring on-die error correction code information;

Step 203, determining bit-width information of the memory device and error scenario information under the bit-width information;

Step 204, determining location information of the error information in a cache line of the memory device based on the side-band error correction code information and the on-die error correction code information;

Step 205, performing an isolation operation on the memory device when the location information matches the error scenario information.

In a specific implementation, the embodiments of the present disclosure can be applied to a server. The server can be used to monitor the Correctable Error information for memory devices, and when the Correctable Error information is monitored, the error information after the Side-band ECC processing, i.e., side-band error correction code information, can be acquired in response to the Correctable Error information, and at the same time, the error information after the on-die ecc repair, i.e., on-die error correction code information, can be acquired.

The embodiments of the present disclosure can also determine the error scenario information under the bit-width information for various memory devices with different bit-widths after determining the bit-width information. For example, the error scenario information can include the number of bit errors in the burst information (Burst) whether different target particles appear in the same cache line at different times.

SPD is an erasable eeprom on the memory module, which records many important information of the memory, such as memory chip and module manufacturer, working frequency, working voltage, speed, capacity, voltage and row and column address bandwidth.

In the specific implementation, the embodiments of the present disclosure can read the bit-width information for the memory device from SPD after the server is inserted into the memory device.

Bank refers to the storage array in the memory bank. Due to the manufacturing process, the size of the memory array of a memory chip is generally not too large, and several arrays need to be used to work separately. A memory bank usually has 4 or 8 banks, depending on the design and specifications of the memory module.

In practical application, the side-band error correction code information (Side-band ECC) can include system address, fault particle, Bank, row and column information, etc., and the on-die error correction code information (on-die Ecc) can include fault particle, Bank and row information.

In practical application, the reading of each cache line (cacheline) is aligned, that is, 512 bytes are aligned.

Therefore, the location of error information in the cache line (cacheline) can be determined by the row and column information in Side-band ECC and on-die Ecc.

When the error location in the cache line (cacheline) matches the error scenario information, the system can identify it as a high-risk error and perform isolation to prevent server crashes caused by such errors.

In the embodiments of the present disclosure, by acquiring side-band error correction code information in response to detecting error information of the memory device; acquiring on-die error correction code information; determining bit-width information of the memory device and error scenario information under the bit-width information; determining location information of the error information in a cache line of the memory device based on the side-band error correction code information and the on-die error correction code information; and performing an isolation operation on the memory device when the location information matches the error scenario information, the technical solution achieves effective isolation of storage memory even when encountering errors beyond the coverage of current memory error correction mechanisms, thereby significantly reducing the probability of system crashes caused by memory device errors.

On the basis of the above-mentioned embodiments, modified embodiments of the above-mentioned embodiments are proposed. It should be noted here that in order to make the description brief, only the differences from the above-mentioned embodiments are described in the modified embodiments.

In an optional embodiment of the present disclosure, the memory device includes a first particle and a second particle, wherein the first particle and the second particle correspond to the same cache line, and the bit-width information is four units; The error scenario information is that there are a plurality of bit errors in the burst information of the cache line when reading the cache line for the first particle at the first time, and there are a plurality of bit errors in the burst information when reading the cache line for the second particle at the second time.

Referring to FIG. 3, FIG. 3 is a schematic diagram A for memory particles provided in an embodiment of the present disclosure;

When the memory device is a memory with a width of X4 bits, the first particle is an A particle and the second particle is an E particle. For example, the error scenario information is: when reading a cache line address of particle A at time point I, a plurality of bit errors are found in a Burst, and when reading the same cache line address of particle E at time point II, a plurality of bit errors are also found in the Burst.

In an optional embodiment of the present disclosure, the memory device includes a first particle and a second particle, wherein the first particle and the second particle correspond to the same cache line, and the bit-width information is four units; The error scenario information is that there are a plurality of bit errors in the burst information of the cache line when reading the cache line for the first particle at the first time, and there are single bit errors in the burst information when reading the cache line for the second particle at the second time, and there are a plurality of target bit errors in the 128-bit data contained in the consecutive prefetch file of the second particle, and the target bit errors are in the same cache line.

Referring to FIG. 4, FIG. 4 is a schematic diagram B for memory particles provided in an embodiment of the present disclosure;

When the memory device is a memory with a width of X4 bits, the first particle is an A particle and the second particle is an E particle. For example, the error scenario information is that when reading a cache line address of particle A at time I, it is found that a Burst of particle A has a plurality of bit errors, and when reading the same cache line address of particle E at time II, it is also found that the Burst has a single bit error. Moreover, there is more than one bit error in the 128-bit data contained in the consecutive prefetch 16 (the error is in a cache line).

Optionally, the memory device includes a first particle and a second particle, wherein the first particle and the second particle correspond to the same cache line, and the bit-width information is four units; The error scenario information is that there are a plurality of bit errors in the burst information of the cache line when reading the cache line for the first particle at the first time, and there are single bit errors in the burst information when reading the cache line for the second particle at the second time, and there are a plurality of target bit errors in the 128-bit data contained in the consecutive prefetch file of the second particle, and the target bit errors are in different cache lines.

Referring to FIG. 5, FIG. 5 is a schematic diagram C for memory particles provided in an embodiment of the present disclosure;

When the memory device is a memory with a width of X4 bits, the first particle is an A particle and the second particle is an E particle. For example, the error scenario information is that when reading a cache line address of particle A at time I, it is found that a Burst has a plurality of bit errors, and when reading the same cache line address of particle E at time II, it is also found that the Burst has a single bit error, and more than one bit error exists in the 128-bit data contained in the consecutive prefetch 16 of the particle (the error spans the cache line).

The above is the determination of specific error scenario information for X4-bit wide memory. By determining the error scenario information for X4-bit wide memory, the coverage of the current ECC mechanism is broadened, thus further reducing the risk of system crash caused by memory device errors.

Referring to FIG. 6, FIG. 6 is a schematic diagram of cache line data provided by an embodiment of the present disclosure. As can be seen from the figure, for DDR5 x8 particles with prefetch 16, the data length of each prefetch is 128 bits, which will not span the cache line. In an optional embodiment of the present disclosure, the memory device includes a first particle and a second particle, wherein the first particle and the second particle correspond to the same cache line, and the bit-width information is eight units; The error scenario information is that there are a plurality of bit errors in the burst information of the cache line when reading the cache line for the first particle at the first time, and a plurality of bit errors in the burst information when reading the cache line for the second particle at the second time. Referring to FIG. 7, FIG. 7 is a schematic diagram D for memory particles provided in an embodiment of the present disclosure;

When the memory device is a memory with a width of X8 bits, the first particle is an A particle and the second particle is an E particle. For example, the error scenario information is that when reading a cache line address of particle A at time I, it is found that there are a plurality of bit errors in a Burst, and when reading the same cache line address of particle E at time II, it is also found that there are a plurality of bit errors in the Burst.

In an optional embodiment of the present disclosure, the memory device includes a first particle and a second particle, wherein the first particle and the second particle correspond to the same cache line, and the bit-width information is eight units; The error scenario information is that there are a plurality of bit errors in the burst information of the cache line when reading the cache line for the first particle at the first time, and there are single bit errors in the burst information when reading the cache line for the second particle at the second time, and there are a plurality of target bit errors in the 128-bit data contained in the consecutive prefetch file of the second particle, and the target bit errors are in the same cache line.

Referring to FIG. 8, FIG. 8 is a schematic diagram E for memory particles provided in an embodiment of the present disclosure;

When the memory device is a memory with a width of X8 bits, the first particle is an A particle and the second particle is an E particle. For example, the error scenario information is that when reading a cache line address of particle A at time I, it is found that a Burst of particle A has a plurality of bit errors, and when reading the same cache line address of particle E at time II, it is also found that the Burst has a single bit error. Moreover, there is more than one bit errors in the 128-bit data contained in the consecutive prefetch 16 (the error is in a cache line).

The above is the determination of specific error scenario information for X8-bit wide memory. By determining the error scenario information for X8-bit wide memory, the coverage of the current ECC mechanism is broadened, thus further reducing the risk of system crash caused by memory device errors.

In an optional embodiment of the present disclosure, the memory device includes a first particle and a second particle, wherein the first particle and the second particle correspond to the same cache line, and the bit-width information is sixteen units; The error scenario information is that there are a plurality of bit errors in the burst information of the cache line when reading the cache line for the first particle at the first time, and there are a plurality of bit errors in the burst information when reading the cache line for the second particle at the second time.

FIG. 9 is a schematic diagram F for memory particles provided in the embodiment of the present disclosure;

When the memory device is a memory with a width of X16 bits, the first particle is an A particle, and the second particle is an E particle. For example, the error scenario information is that when reading a cache line address of particle A at time I, it is found that a Burst of particle A has a plurality of bit errors, and when reading the same cache line address of particle E at time II, it is also found that the Burst has a plurality of bit errors.

In an optional embodiment of the present disclosure, the memory device includes a first particle and a second particle, wherein the first particle and the second particle correspond to the same cache line, and the bit-width information is sixteen units; The error scenario information is that there are a plurality of bit errors in the burst information of the cache line when reading the cache line for the first particle at the first time, and there are single bit errors in the burst information when reading the cache line for the second particle at the second time, and there are a plurality of target bit errors in the 128-bit data contained in the consecutive prefetch file of the second particle.

Figures 10, 11:
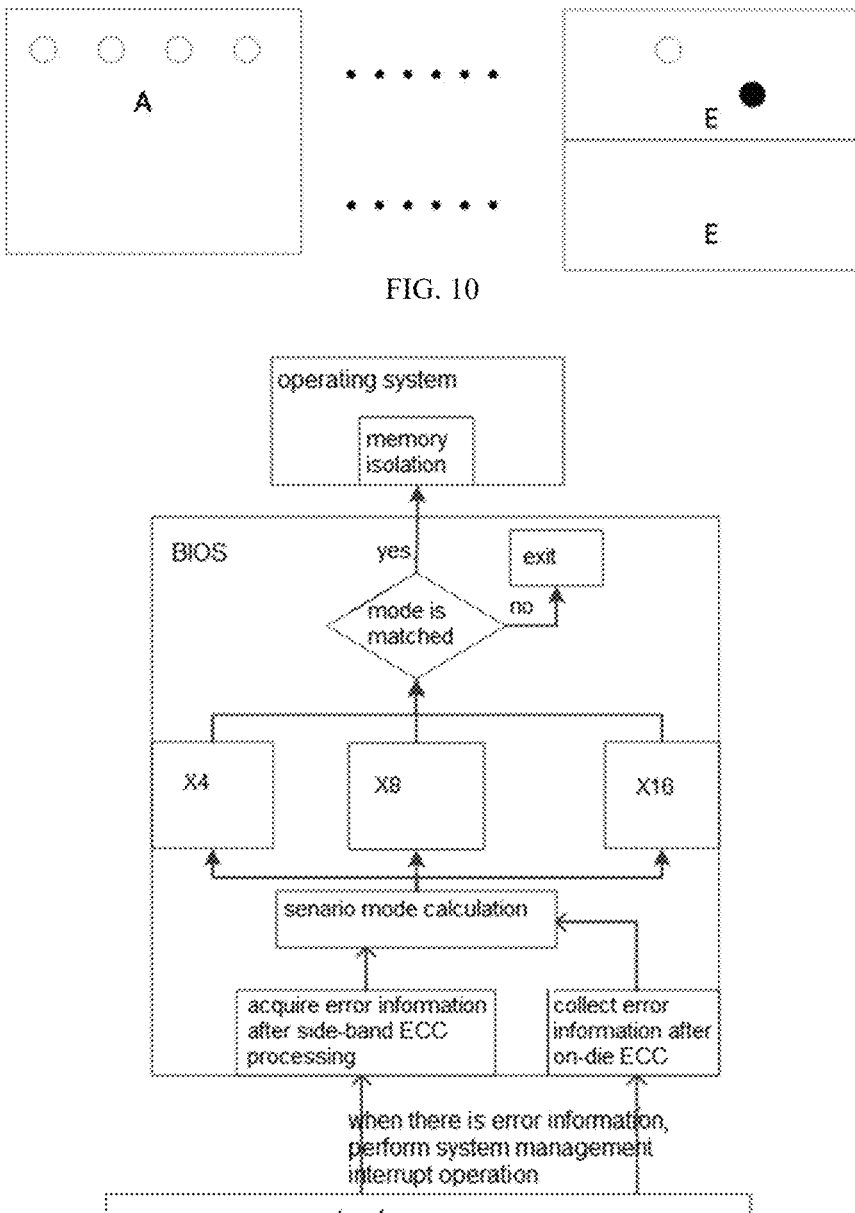
FIG. 10 is a schematic diagram G for memory particles provided in an embodiment of the present disclosure.
FIG. 11 is a flowchart of a memory device control method provided in an embodiment of the present disclosure.

Referring to FIG. 10, FIG. 10 is a schematic diagram G for memory particles provided in an embodiment of the present disclosure;

When the memory device is a memory with a width of X16 bits, the first particle is an A particle and the second particle is an E particle. For example, the error scenario information is that when reading a cache line address of particle A at time I, it is found that a Burst of particle A has a plurality of bit errors, and when reading the same cache line address of particle E at time II, it is also found that the Burst has a single bit error, and there is more than one bit errors in the 128-bit (calculation area of on-die ECC) data contained in the consecutive prefetch 16.

The above is the determination of specific error scenario information for X16-bit wide memory. By determining the error scenario information for X8-bit wide memory, the coverage of the current ECC mechanism is broadened, thus further reducing the risk of system crash caused by memory device errors.

When the above error scenario information appears, there is an uncorrectable risk of the cache line error. Therefore, when the error information matches the error scenario information in the cache line, use fault isolation measures or fault repair measures to deal with the risk in time and avoid more serious errors (system crash).

In an optional embodiment of the present disclosure, a memory device is mounted on a server, the server is configured with a basic input and output system BIOS, and the memory device is provided with a corresponding memory controller IMC. In the concrete implementation, the embodiment of the present disclosure can respond to monitoring the error information of the memory device, perform an inspection operation on the memory device IMC using the memory controller, and trigger the basic input and output system to execute a system management interrupt operation SMI, thus further reducing the risk of server system crash caused by memory errors.

In an alternative embodiment of the present disclosure, the step of acquiring side-band error correction code information includes: acquiring side-band error correction code information by using a basic input and output system.

Optionally, the step of acquiring the error correction code information on the particles includes:

acquiring the error correction code information on the particles by using the basic input and output system.

Because BIOS is the first system to start when booting, it can effectively improve the efficiency of ECC acquisition by acquiring side-band error correction code information and particle error correction code information from BIOS.

In an alternative embodiment of the present disclosure, the method is applied to the error checking and correcting procedure, and further includes:

when the position information does not match the error scenario information, exiting the error check and correction program by using the basic input and output system.

In the concrete implementation, when the position information does not match the error scenario information, it can be judged that the error is not an uncorrectable error, that is, the risk of the error is not high, and the error checking and correction program can be directly exited to reduce the thread occupation.

In an optional embodiment of the present disclosure, the server is configured with an operating system, and the step of isolating the memory device includes:

generating power management standard event information for memory devices by using the basic input and output system;

sending the power management standard event information to the operating system by using the basic input and output system, to control the operating system to perform system control interrupt on memory devices.

In practical application, the server can be configured with an operating system OS. In the present disclosure, the basic input and output system can be used to generate power management standard event information for memory devices, and the basic input and output system can be used to send the power management standard event information to the operating system to control the operating system to perform system control interrupt on the memory devices. Optionally, the operating system can also be used to invoke the platform error interface to generate offline page information for memory devices, that is, the OS can use APEI as the page offline of the faulty memory to prevent the subsequent wrong address from being accessed continuously, resulting in error upgrade.

In an optional embodiment of the present disclosure, the method further includes:

when the location information matches the error scenario information, performing a repair operation on the memory device.

In the specific implementation, the embodiment of the present disclosure can not only isolate the faulty memory device, but also repair it, thus improving the availability of the server.

Optionally, the step of performing the repair operation on the memory device includes: performing the repair operation on memory devices by using an adaptive dual-device data correction mechanism (ADDDC).

The full name of ADDDC is Adaptive DDDC, which is divided into SR (Single Region) and MR (Multi Regions).

The functionality of ADDDC-SR primarily enables a total of two faulty memory particle replacements within the same Rank (this feature is not supported for X8 memory particles).

The functionality of ADDDC-MR is to repair the hard failures of DRAM particles in Virtual lockstep mode. When a hard fault occurs at the granularity of Bank/Rank region, it will be mapped out by adaptive virtual lockstep. In addition, there is ADDDC-MR+1, which can allow two such hard failures while maintaining the ability to correct one additional bit error.

According to the embodiment of the present disclosure, the memory device can be repaired by adopting an adaptive dual-device data correction mechanism, to improve the repairing capability of high-risk errors.

Optionally, the step of performing the repair operation on the memory device includes:

performing the repair operation on the memory device by using a post-packaging repair mechanism.

post-packaging Repair (PPR), in the embodiment of the present disclosure, the memory device can be repaired by adopting the PPR repair mechanism, to improve the repair capability for high-risk errors.

Optionally, the embodiment of the present disclosure can also use the a partial cache line sparing mechanism (PCLS) to perform repair operation on the memory device, to improve the repair capability for high-risk errors.

In order to make persons skilled in the art better understand the embodiment of the present disclosure, an example is used to explain the embodiment of the present disclosure below.

Referring to FIG. 11, FIG. 11 is a flowchart of a memory device control method provided in an embodiment of the present disclosure.

The implementation process can be implemented by a BIOS system and an OS system. The implementation process of BIOS and OS is as follows.

1) When CE is generated in the memory and a system management interrupt operation SMI is triggered, BIOS collects error information after Side-band ECC processing;

2) At the same time, the system management interrupt operation SMI is set to complete the inspection. When the memory controller IMC completes the inspection, SMI is triggered, and the BIOS actively collects the error information after the on-die ECC is repaired;

3) The BIOS collects error information processed by both On-die ECC and Side-band ECC, then evaluates whether the errors match specific scenario modes corresponding to the currently configured memory bit width of the system;

4) When the scenario mode is not matched, the program exits;

5) When the scenario mode is matched, the SCI mode of BIOS APEI is used, the common platform error record identifier CPER flag of APEI is set, and the first address of the executable page is filled in the table of APEI;

OS uses APEI as the page offline of fault memory to prevent the subsequent wrong address from being accessed continuously, resulting in error upgrade.

It should be noted that for the method embodiments, the descriptions are simplified as a series of operational sequences. However, those skilled in the art will appreciate that the embodiments of the present disclosure are not limited by the described order of operations, as certain steps may be performed in alternative sequences or concurrently according to these embodiments. Furthermore, professionals should understand that the embodiments described in the specification represent preferred implementations, and the specified operations are not necessarily mandatory for all embodiments of the present disclosure.

Figure 12:
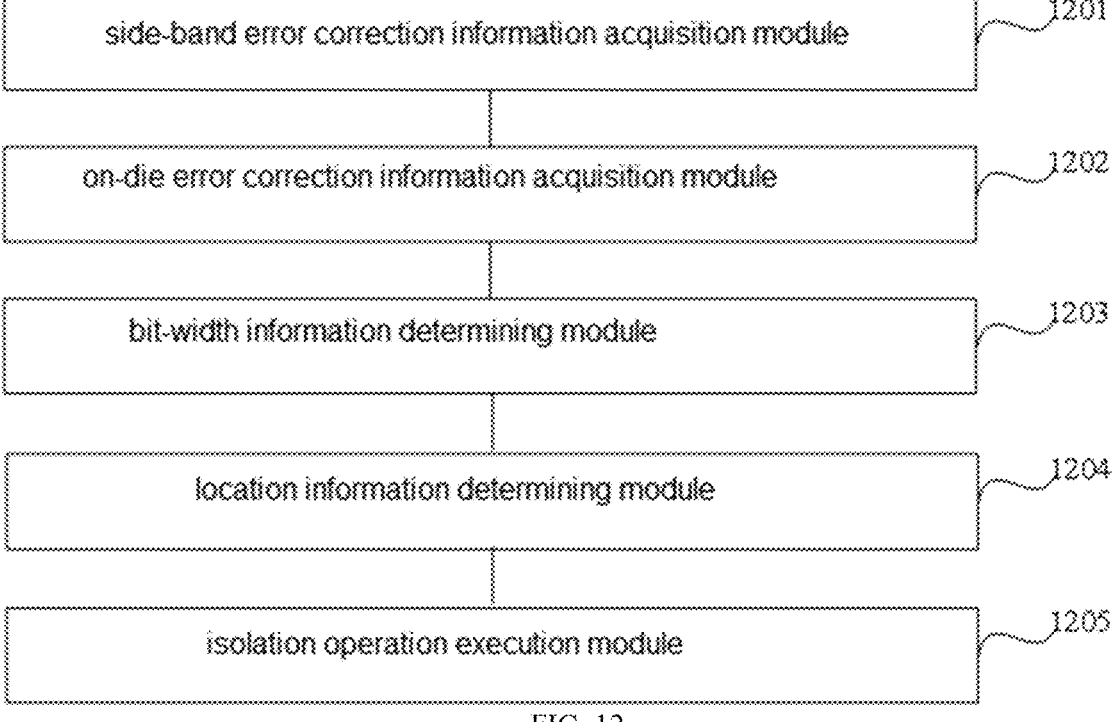
FIG. 12 is a structural block diagram of a memory device control apparatus provided in an embodiment of the present disclosure.

With reference to FIG. 12, a structural block diagram of a memory device control apparatus provided in an embodiment of the present disclosure is shown, which can specifically include the following modules:

a side-band error correction code information acquisition module 1201, configured to in response to detecting error information of the memory device, acquire side-band error correction code information;

a on-die error correction code information acquisition module 1202, configured to acquire on-die error correction code information;

a bit-width information determining module 1203, configured to determine bit-width information of the memory device and error scenario information under the bit-width information;

a location information determining module 1204, configured to determine location information of the error information in a cache line of the memory device based on the side-band error correction code information and the on-die error correction code information;

and an isolation operation execution module 1205, configured to perform an isolation operation on the memory device when the location information matches the error scenario information.

Optionally, the memory device includes a first particle and a second particle, the first particle and the second particle correspond to the same cache line, the bit-width information is four units; and the error scenario information is that there are a plurality of bit errors in burst information of the cache line when reading the cache line for the first particle at a first time and there are a plurality of bit errors in the burst information when reading the cache line for the second particle at a second time.

Optionally, the memory device includes a first particle and a second particle, the first particle and the second particle correspond to the same cache line, the bit-width information is four units; and the error scenario information is that there are a plurality of bit errors in the burst information of the cache line when reading the cache line for the first particle at a first time, and there are single bit errors in the burst information when reading the cache line for the second particle at the second time, and there are a plurality of target bit errors in 128-bit data contained in a consecutive prefetch file of the second particle, and the target bit errors are in the same cache line.

Optionally, the memory device includes a first particle and a second particle, the first particle and the second particle correspond to the same cache line, the bit-width information is four units; and the error scenario information is that there are a plurality of bit errors in the burst information of the cache line when reading the cache line for the first particle at a first time, and there are single bit errors in the burst information when reading the cache line for the second particle at the second time, and there are a plurality of target bit errors in 128-bit data contained in a consecutive prefetch file of the second particle, and the target bit errors are in different cache lines.

Optionally, the memory device includes a first particle and a second particle, the first particle and the second particle correspond to the same cache line, the bit-width information is eight units or sixteen units; and the error scenario information is that there are a plurality of bit errors in the burst information of the cache line when reading the cache line for the first particle at a first time, and there are a plurality of bit errors in the burst information when reading the cache line for the second particle at a second time.

Optionally, the memory device includes a first particle and a second particle, the first particle and the second particle correspond to the same cache line, the bit-width information is eight units; and the error scenario information is that there are a plurality of bit errors in the burst information of the cache line when reading the cache line for the first particle at a first time, and there are single bit errors in the burst information when reading the cache line for the second particle at the second time, and there are a plurality of target bit errors in 128-bit data contained in a consecutive prefetch file of the second particle, and the target bit errors are in the same cache line.

Optionally, the memory device includes a first particle and a second particle, the first particle and the second particle correspond to the same cache line, the bit-width information is sixteen units; and the error scenario information is that there are a plurality of bit errors in the burst information of the cache line when reading the cache line for the first particle at a first time, and there are single bit errors in the burst information when reading the cache line for the second particle at a second time, and there are a plurality of target bit errors in 128-bit data contained in a consecutive prefetch file of the second particle.

Optionally, the memory device is mounted on a server, the server is configured with a basic input and output system, and the memory device is provided with a corresponding memory controller, and the apparatus further includes:

in response to monitoring the error information of the memory device, performing an inspection operation on the memory device using the memory controller, and triggering the basic input and output system to execute a system management interrupt operation.

Optionally, the side-band error correction code information acquisition module includes:

acquiring side-band error correction code information by using the basic input and output system.

Optionally, the on-die error correction code information acquisition module includes:

acquiring on-die error correction code information by using the basic input and output system.

Optionally, the method is applied to error checking and correcting procedures, and the apparatus further includes:

an error checking and correcting procedure existing module, configured to when the location information does not match the error scenario information, exit the error checking and correcting procedure by the basic input and output system.

Optionally, the server is configured with an operating system, and the isolation operation execution module includes:

a power management standard event information generation module, configured to use the basic input and output system to generate power management standard event information for the memory device;

a memory device executing system control interrupt module, configured to send the power management standard event information to the operating system by using the basic input and output system to control the operating system to perform system control interrupt on the memory device.

Optionally, the apparatus further including:

a repair module, configured to when the location information matches the error scenario information, perform a repair operation on the memory device.

Optionally, the repair module includes:

a first repair module, configured to perform the repair operation on the memory device by using an adaptive dual-device data correction mechanism.

Optionally, the repair module includes:

a second repair module, configured to perform the repair operation on the memory device by using a post-packaging repair mechanism.

Optionally, the repair module includes:

a third repair module, configured to perform the repair operation on the memory device by using a partial cache line sparing mechanism.

Optionally, the apparatus further including:

an offline page information generation module, configured to generate offline page information for the memory device by invoking a platform error interface using the operating system.

For apparatus embodiments, the descriptions are relatively concise as they substantially correspond to the method embodiments. For relevant details, reference may be made to the explanations provided for the method embodiments.

The embodiments of the present disclosure further discloses a server, wherein the server is provided with a memory device, and is configured to acquire side-band error correction code information in response to detecting error information of the memory device; acquire on-die error correction code information; determine bit-width information of the memory device and error scenario information under the bit-width information; determine location information of the error information in a cache line of the memory device based on the side-band error correction code information and the on-die error correction code information; and perform an isolation operation on the memory device when the location information matches the error scenario information.

For server embodiments, the descriptions are relatively concise as they substantially correspond to the method embodiments. For relevant details, reference may be made to the explanations provided for the method embodiments.

Additionally, embodiments of the present disclosure provide an electronic device comprising: a processor, a memory, and a computer program stored on the memory and executable by the processor. When executed by the processor, the computer program implements all processes of the aforementioned memory device control method embodiments and achieves equivalent technical effects. To avoid redundancy, these details will not be reiterated here.

The embodiments of the present disclosure further provide a computer-readable non-transitory storage medium having stored thereon a computer program. When executed by a processor, the computer program implements all processes of the aforementioned memory device control method embodiments and achieves equivalent technical effects. To avoid redundancy, these details will not be reiterated here. The computer-readable non-transitory storage medium includes, but is not limited to: Read-Only Memory (ROM), Random Access Memory (RAM), magnetic disks, or optical discs, among others.

Figure 13:
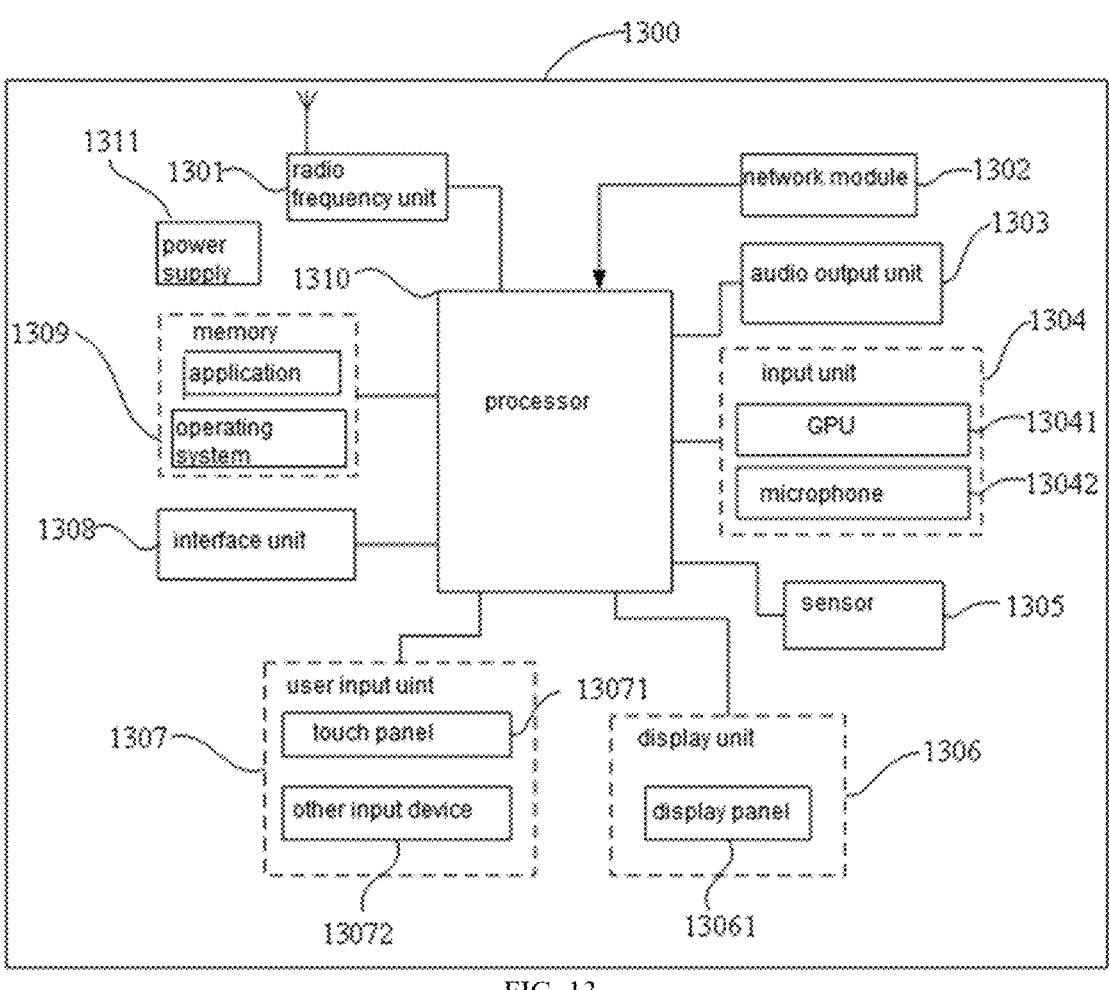
FIG. 13 is a hardware structure block diagram of an electronic device provided in an embodiment of the present disclosure.

FIG. 13 is a schematic diagram of the hardware structure of an electronic device for implementing various embodiments of the present disclosure.

The electronic device 1300 includes, but is not limited to, a radio frequency unit 1301, a network module 1302, an audio output unit 1303, an input unit 1304, a sensor 1305, a display unit 1306, a user input unit 1307, an interface unit 1308, a memory 1309, a processor 1310, and a power supply 1311. It can be understood by those skilled in the art that the structure of the electronic equipment shown in FIG. 13 does not constitute a limitation to the electronic equipment, and the electronic equipment may include more or less components than shown, or combine some components, or have different component arrangements. In the embodiment of the application, electronic devices include, but are not limited to, mobile phones, tablet computers, notebook computers, palmtop computers, vehicle-mounted terminals, wearable devices, pedometers and the like.

It should be understood that in this embodiment of the application, the RF unit 1301 can be used to receive and send signals during the process of receiving and sending information or talking, specifically, the downlink data from the base station is received and processed by the processor 1310; In addition, the uplink data is sent to the base station. Generally, the RF unit 1301 includes, but is not limited to, an antenna, at least one amplifier, a transceiver, a coupler, a low noise amplifier, a duplexer, and the like. In addition, the RF unit 1301 can also communicate with networks and other devices through a wireless communication system.

Electronic devices provide users with wireless broadband Internet access through the network module 1302, such as helping users to send and receive emails, browse web pages and access streaming media.

The audio output unit 1303 can convert audio data received by the RF unit 1301 or the network module 1302 or stored in the memory 1309 into audio signals and output them as sound. Moreover, the audio output unit 1303 can also provide audio output related to specific functions performed by the electronic device 1300 (for example, call signal receiving sound, message receiving sound, etc.). The audio output unit 1303 includes a speaker, a buzzer and a receiver.

The input unit 1304 is used to receive audio or video signals. The input unit 1304 may include a Graphics Processing Unit (GPU) 13041 and a microphone 13042. The graphics processor 13041 processes image data of still pictures or videos obtained by an image capture device (such as a camera) in a video capture mode or an image capture mode. The processed image frame may be displayed on the display unit 1306. The image frames processed by the graphics processor 13041 can be stored in the memory 1309 (or other storage media) or transmitted via the radio frequency unit 1301 or the network module 1302. The microphone 13042 can receive sounds and can process such sounds into audio data. The processed audio data can be converted into a format that can be sent to the mobile communication base station via the radio frequency unit 1301 in the case of telephone conversation mode.

The electronic device 1300 also includes at least one sensor 1305, such as a light sensor, a motion sensor and other sensors. Specifically, the optical sensor includes an ambient light sensor and a proximity sensor, wherein the ambient light sensor can adjust the brightness of the display panel 13061 according to the brightness of ambient light, and the proximity sensor can turn off the display panel 13061 and/or backlight when the electronic device 1300 moves to the ear. As a kind of motion sensor, accelerometer sensor can detect the magnitude of acceleration in all directions (generally three axes), and the magnitude and direction of gravity at rest, which can be used to identify the attitude of electronic equipment (such as horizontal and vertical screen switching, related games, magnetometer attitude calibration), vibration identification related functions (such as pedometer, tapping), etc. The sensor 1305 may also include a fingerprint sensor, a pressure sensor, an iris sensor, a molecular sensor, a gyroscope, a barometer, a hygrometer, a thermometer, an infrared sensor, etc., which are not described in detail here.

The display unit 1306 is used to display information input by the user or information provided to the user. The display unit 1306 may include a display panel 13061, which may be configured in the form of a Liquid Crystal Display (LCD) or an organic light-emitting diode (OLED).

The user input unit 1307 can be used to receive input digital or character information and generate key signal input related to user settings and function control of electronic equipment. Specifically, the user input unit 1307 includes a touch panel 13071 and other input devices 13072. The touch panel 13071, also known as a touch screen, can collect touch operations of users on or near the touch panel 13071 (for example, operations of users on or near the touch panel 13071 with any suitable objects or accessories such as fingers and a stylus). The touch panel 13071 may include a touch detection device and a touch controller. Wherein, the touch detection device detects the touch orientation of the user, detects the signal brought by the touch operation, and transmits the signal to the touch controller; The touch controller receives touch information from the touch detection device, converts it into contact coordinates, and then sends it to the processor 1310, and receives the command sent by the processor 1310 and executes it. In addition, the touch panel 13071 can be realized by various types such as resistive, capacitive, infrared and surface acoustic wave. In addition to the touch panel 13071, the user input unit 1307 may also include other input devices 13072. Specifically, other input devices 13072 may include, but are not limited to, a physical keyboard, function keys (such as volume control buttons, switch buttons, etc.), a trackball, a mouse, and a joystick, which are not described in detail here.

Further, the touch panel 13071 can be covered on the display panel 13061. When the touch panel 13071 detects a touch operation on or near it, it is transmitted to the processor 1310 to determine the type of touch event, and then the processor 1310 provides corresponding visual output on the display panel 13061 according to the type of touch event. Although in FIG. 13, the touch panel 13071 and the display panel 13061 are two independent components to realize the input and output functions of the electronic device, in some embodiments, the touch panel 13071 and the display panel 13061 can be integrated to realize the input and output functions of the electronic device, and the details are not limited here.

The interface unit 1308 is an interface between an external device and the electronic device 1300. For example, the external device may include a wired or wireless headset port, an external power supply (or battery charger) port, a wired or wireless data port, a memory card port, a port for connecting a device with an identification module, an audio input/output (I/O) port, a video I/O port, an earphone port, and the like. The interface unit 1308 may be used to receive input (e.g., data information, power, etc.) from an external device and transmit the received input to one or more elements within the electronic device 1300 or may be used to transmit data between the electronic device 1300 and the external device.

The memory 1309 can be used to store software programs and various data. The memory 1309 may mainly include a storage program area and a storage data area, wherein the storage program area may store an operating system, application programs required by at least one function (such as sound playing function, image playing function, etc.), etc. The data storage area can store data (such as audio data, phone book, etc.) created according to the use of the mobile phone. In addition, the memory 1309 may include a high-speed random access memory, and may also include a nonvolatile memory, such as at least one disk memory device, a flash memory device, or other volatile solid-state memory devices.

The processor 1310 is the control center of electronic equipment, which connects all parts of the whole electronic equipment with various interfaces and lines, and performs various functions and processes data of the electronic equipment by running or executing software programs and/or modules stored in the memory 1309 and calling data stored in the memory 1309, thus monitoring the electronic equipment as a whole. The processor 1310 may include one or more processing units; Preferably, the processor 1310 can integrate an application processor and a modem processor, wherein the application processor mainly handles the operating system, user interface and application programs, and the modem processor mainly handles wireless communication. It can be understood that the above modem processor may not be integrated into the processor 1310.

The electronic device 1300 may also include a power supply 1311 (such as a battery) for supplying power to various components. Preferably, the power supply 1311 may be logically connected with the processor 1310 through a power management system, to realize the functions of managing charging, discharging and power consumption management through the power management system.

In addition, the electronic device 1300 includes some functional modules not shown, which are not described in detail here.

It should be noted that in this paper, the terms "including", "containing" or any other variation thereof are intended to cover non-exclusive inclusion, so that a process, method, article or device including a series of elements includes not only those elements, but also other elements not explicitly listed, or elements inherent to such process, method, article or device. Without more restrictions, an element defined by the phrase "including one" does not exclude the existence of other identical elements in the process, method, article or device including the element. Through the description of the above embodiments, those skilled in the art can clearly understand that the methods of the above embodiments can be realized by means of software and necessary general hardware platform, and of course they can also be realized by hardware, but in many cases, the former is the better embodiment. Based on this understanding, the technical scheme of the present disclosure can be embodied in the form of a software product, which is stored in a storage medium (such as ROM/RAM, magnetic disk and optical disk) and includes several instructions to make a terminal (which can be a mobile phone, a computer, a server, an air conditioner or a network device, etc.) execute the methods of various embodiments of the present disclosure.

Figure 14:
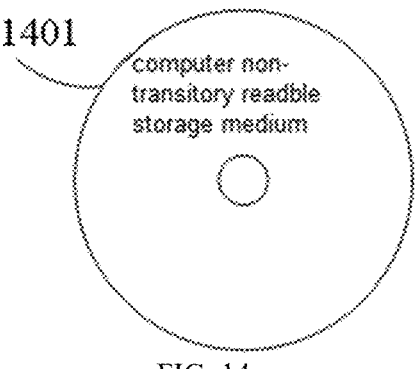
FIG. 14 is a schematic diagram of a computer non-transitory readable storage medium provided in an embodiment of the present disclosure.

As shown in FIG. 14, in another embodiment provided by the present disclosure, a computer non-transitory readable storage medium 1401 is also provided, and instructions are stored in the computer nonvolatile readable storage medium, which, when run on a computer, causes the computer to execute the memory device control method in the above embodiment.

The embodiments of the present disclosure have been described above with the attached drawings, but the present disclosure is not limited to the above specific embodiments, which are only schematic, not restrictive. Under the inspiration of the present disclosure, persons skilled in the art can make many forms without departing from the purpose of the present disclosure and the scope protected by the claims, which are all within the protection of the present disclosure. Those skilled in the art can realize that the units and algorithm steps of various examples described in connection with the embodiments disclosed in the embodiments of the present disclosure can be realized by electronic hardware, or a combination of computer software and electronic hardware. Whether these functions are implemented in hardware or software depends on the specific application and design constraints of the technical scheme. Those skilled in the art can use different methods to realize the described functions for each specific application, but this implementation should not be considered beyond the scope of the present disclosure.

It can be clearly understood by those skilled in the art that for the convenience and conciseness of description, the specific working processes of the systems, devices and units described above can refer to the corresponding processes in the aforementioned method embodiments, and will not be repeated here.

In the embodiments provided by the present disclosure, it should be understood that the disclosed devices and methods can be realized in other ways. For example, the device embodiment described above is only schematic. For example, the division of units is only a logical function division. In actual implementation, there may be other division methods, such as multiple units or components can be combined or integrated into another system, or some features can be ignored or not implemented. On the other hand, the mutual coupling or direct coupling or communication connection shown or discussed can be indirect coupling or communication connection through some interfaces, devices or units, which can be electrical, mechanical or other forms.

The units described as separate components may or may not be physically separated, and the components displayed as units may or may not be physical units, that is, they may be located in one place or distributed to multiple network units. Some or all of the units can be selected according to actual needs to achieve the purpose of the embodiments.

In addition, each functional unit in each embodiment of the present disclosure can be integrated into one processing unit, or each unit can exist physically alone, or two or more units can be integrated into one unit.

Functions can be stored in a computer-readable storage medium if they are realized in the form of software functional units and sold or used as independent products. Based on this understanding, the technical scheme of the present disclosure can be embodied in the form of a software product, which is stored in a storage medium and includes several instructions to make a computer device (which can be a personal computer, a server, a network device, etc.) execute all or part of the steps of the methods of various embodiments of the present disclosure. The aforementioned storage media include: U disk, mobile hard disk, ROM, RAM, magnetic disk or optical disk and other media that can store program codes.

The above is only the specific implementation of the present disclosure, but the protection scope of the present disclosure is not limited to this. Any person skilled in the art can easily think of changes or substitutions within the technical scope disclosed in the present disclosure, which should be covered by the present disclosure. Therefore, the protection scope of the present disclosure should be based on the protection scope of the claims.

The invention claimed is:

1. A memory device control method, comprising:
  acquiring side-band error correction code information in response to monitoring error information of the memory device;
  acquiring on-die error correction code information;
  determining bit-width information of the memory device and error scenario information under the bit-width information;
  determining location information of the error information in a cache line of the memory device based on the side-band error correction code information and the on-die error correction code information; and
  performing an isolation operation on the memory device when the location information matches the error scenario information.

2. The memory device control method according to claim 1, wherein the memory device comprises a first particle and a second particle, the first particle and the second particle correspond to the same cache line, the bit-width information is four units; and the error scenario information is that there are a plurality of bit errors in burst information of the cache line when reading the cache line for the first particle at a first time and there are a plurality of bit errors in the burst information when reading the cache line for the second particle at a second time.

3. The memory device control method according to claim 1, wherein the memory device comprises a first particle and a second particle, the first particle and the second particle correspond to the same cache line, the bit-width information is four units; and the error scenario information is that there are a plurality of bit errors in burst information of the cache line when reading the cache line for the first particle at a first time, there is a single bit error in the burst information when reading the cache line for the second particle at a second time, and there are a plurality of target bit errors in 128-bit data comprised in a consecutive prefetch file of the second particle, and the plurality of target bit errors are in the same cache line.

4. The memory device control method according to claim 1, wherein the memory device comprises a first particle and a second particle, the first particle and the second particle correspond to the same cache line, the bit-width information is four units; and the error scenario information is that there are a plurality of bit errors in burst information of the cache line when reading the cache line for the first particle at a first time, and there is a single bit error in the burst information when reading the cache line for the second particle at a second time, and there are a plurality of target bit errors in 128-bit data comprised in a consecutive prefetch file of the second particle, and the plurality of target bit errors are in different cache lines.

5. The memory device control method according to claim 1, wherein the memory device comprises a first particle and a second particle, the first particle and the second particle correspond to the same cache line, the bit-width information is eight units or sixteen units; and the error scenario information is that there are a plurality of bit errors in burst information of the cache line when reading the cache line for the first particle at a first time, and there are a plurality of bit errors in the burst information when reading the cache line for the second particle at a second time.

6. The memory device control method according to claim 1, wherein the memory device comprises a first particle and a second particle, the first particle and the second particle correspond to the same cache line, the bit-width information is eight units; and the error scenario information is that there are a plurality of bit errors in burst information of the cache line when reading the cache line for the first particle at a first time, and there is a single bit error in the burst information when reading the cache line for the second particle at a second time, and there are a plurality of target bit errors in 128-bit data comprised in a consecutive prefetch file of the second particle, and the plurality of target bit errors are in the same cache line.

7. The memory device control method according to claim 1, wherein the memory device comprises a first particle and a second particle, the first particle and the second particle correspond to the same cache line, the bit-width information is sixteen units; and the error scenario information is that there are a plurality of bit errors in burst information of the cache line when reading the cache line for the first particle at a first time, and there is a single bit error in the burst information when reading the cache line for the second particle at a second time, and there are a plurality of target bit errors in 128-bit data comprised in a consecutive prefetch file of the second particle.

8. The memory device control method according to claim 1, wherein the memory device is mounted on a server, the server is configured with a basic input and output system, the memory device is provided with a corresponding memory controller, and the method further comprises:
  in response to monitoring the error information of the memory device, performing an inspection operation on the memory device using the memory controller, and triggering the basic input and output system to execute a system management interrupt operation.

9. The memory device control method according to claim 8, wherein the step of acquiring the side-band error correction code information comprises:
  acquiring the side-band error correction code information by using the basic input and output system.

10. The memory device control method according to claim 9, wherein the step of acquiring the on-die error correction code information comprises:
  acquiring on-die error correction code information by using the basic input and output system.

11. The memory device control method according to claim 8, wherein the method is applied to error checking and correcting procedures, and further comprises:
  when the location information does not match the error scenario information, exiting the error checking and correcting procedures by the basic input and output system.

12. The memory device control method according to claim 8, wherein the server is configured with an operating system, and the step of performing the isolation operation on the memory device comprises:

using the basic input and output system to generate power management standard event information for the memory device; and sending the power management standard event information to the operating system by using the basic input and output system, to control the operating system to perform system control interrupt on the memory device.

13. The memory device control method according to claim 8, further comprising:

when the location information matches the error scenario information, performing a repair operation on the memory device.

14. The memory device control method according to claim 13, wherein the step of performing the repair operation on the memory device comprises:

performing the repair operation on the memory device by using an adaptive dual-device data correction mechanism.

15. The memory device control method according to claim 13, wherein the step of performing the repair operation on the memory device comprises:

performing the repair operation on the memory device by using a post-packaging repair mechanism.

16. The memory device control method according to claim 13, wherein the step of performing the repair operation on the memory device comprises:

performing the repair operation on the memory device by using a partial cache line sparing mechanism.

17. The memory device control method according to claim 12, further comprising:

generating offline page information for the memory device by invoking a platform error interface using the operating system.

18. A server, wherein the server is provided with a memory device, and is configured to acquire side-band error correction code information in response to detecting error information of the memory device; acquire on-die error correction code information; determine bit-width information of the memory device and error scenario information under the bit-width information; determine location information of the error information in a cache line of the memory device based on the side-band error correction code information and the on-die error correction code information; and perform an isolation operation on the memory device when the location information matches the error scenario information.

19. An electronic device comprising a processor, a communication interface, a memory and a communication bus, wherein the processor, the communication interface and the memory communicate with each other through the communication bus;

the memory is configured to store computer programs;

the processor is configured to implement the method according to claim 1 when executing the program stored in the memory.

20. A non-transitory computer-readable storage medium, having instructions stored thereon, wherein the instructions, when executed by one or more processors, cause the one or more processors to perform the method according to claim 1.

* * * * *